(12) United States Patent
Michalski et al.

(10) Patent No.: US 10,833,543 B2
(45) Date of Patent: Nov. 10, 2020

(54) STATOR ASSEMBLY

(71) Applicant: GE AVIATION SYSTEMS LLC, Grand Rapids, MI (US)

(72) Inventors: Michael Francis Michalski, Beavercreek, OH (US); Todd Eric Rook, Tipp City, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 613 days.

(21) Appl. No.: 15/722,546

(22) Filed: Oct. 2, 2017

(65) Prior Publication Data

US 2019/0103772 A1 Apr. 4, 2019

(51) Int. Cl.
| | | |
|---|---|---|
| *H02K 1/16* | (2006.01) | |
| *H02K 3/48* | (2006.01) | |
| *H02K 3/28* | (2006.01) | |
| *H02K 1/17* | (2006.01) | |

(52) U.S. Cl.
CPC ............... *H02K 1/165* (2013.01); *H02K 1/17* (2013.01); *H02K 3/28* (2013.01); *H02K 3/48* (2013.01)

(58) Field of Classification Search
CPC ............. H02K 3/48; H02K 1/16; H02K 1/165
USPC ..................... 310/78, 208, 216.069
See application file for complete search history.

(56) References Cited

U.S. PATENT DOCUMENTS

| | | | |
|---|---|---|---|
| 4,241,274 A | 12/1980 | Brammerlo | |
| 5,723,930 A | 3/1998 | Ho | |
| 6,414,410 B1* | 7/2002 | Nakamura | H02K 3/12 310/179 |
| 7,183,688 B2* | 2/2007 | Hans | H02K 1/16 310/179 |
| 8,461,739 B2 | 6/2013 | Wu | |
| 8,680,740 B2 | 3/2014 | Chin | |
| 2004/0207284 A1* | 10/2004 | Neet | H02K 1/165 310/215 |
| 2005/0280327 A1* | 12/2005 | Neet | H02K 3/345 310/214 |
| 2010/0176675 A1* | 7/2010 | Labbe | H02K 3/32 310/154.01 |
| 2011/0181146 A1* | 7/2011 | Asano | H02K 3/12 310/208 |
| 2014/0145540 A1* | 5/2014 | Detela | H02K 3/12 310/180 |

(Continued)

FOREIGN PATENT DOCUMENTS

| | | |
|---|---|---|
| CN | 202586522 U | 12/2012 |
| CN | 203398892 U | 1/2014 |
| CN | 103915962 A | 7/2014 |

(Continued)

OTHER PUBLICATIONS

Chinese Patent Office, Office Action re Corresponding Application No. 201811156349.9, dated May 27, 2020, 10 pages, China.

*Primary Examiner* — Gary A Nash
(74) *Attorney, Agent, or Firm* — McGarry Bair PC

(57) ABSTRACT

A stator core and method of forming a stator assembly for an electric machine, including a cylindrical stator core, a set of posts extending radially inward from the stator core defining a set of slots between adjacent posts, and a set of windings formed by conductive wire wound in a fewer than all of the set the slots, defining a first subset of wound slots and a second subset of empty slots.

20 Claims, 4 Drawing Sheets

(56) References Cited

U.S. PATENT DOCUMENTS

2016/0013692 A1    1/2016   El Wardany
2016/0056679 A1*  2/2016   Sakaue .................. H02K 3/12
                                                             310/198

FOREIGN PATENT DOCUMENTS

| CN | 104518580 A    | 4/2015 |
|----|----------------|--------|
| CN | 204597648 U    | 8/2015 |
| CN | 205017123 U    | 2/2016 |
| DE | 102006003598 A1| 8/2007 |
| JP | S5778339 A     | 5/1982 |
| WO | 2018022364 A1  | 2/2018 |

* cited by examiner

STATOR ASSEMBLY

BACKGROUND OF THE INVENTION

Electric machines, such as electric motors or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. Regardless of the mode, an electric machine typically includes a stator with windings that works in conjunction with a rotor that also has windings and is driven to rotate by a source of rotation, which for a generator can be a gas turbine engine or for a motor can be the stator.

BRIEF DESCRIPTION OF THE INVENTION

In one aspect, the present disclosure relates to a stator assembly for an electric machine, including a cylindrical stator core, a set of posts extending radially inward from the stator core defining a set of slots between adjacent posts, and a set of windings formed by conductive wire wound in a fewer than all of the set the slots, defining a first subset of wound slots and a second subset of empty slots. A subset of posts facing a respective empty slot are adapted to resist circumferential bending toward to the respective empty slot.

In another aspect, the present disclosure relates to a method of forming a stator assembly for an electric machine, including providing a cylindrical stator core having a set of posts extending radially inward from the stator core defining a set of slots between adjacent posts, the set of slots comprising a first subset of winding slots and a second subset of empty slots, wherein a subset of posts facing the a respective empty slot are adapted to resist circumferential bending toward to the respective empty slot, and winding conductive wiring about a subset of the posts to occupy the first subset of winding slots with the conductive wiring.

In yet another aspect, the present disclosure relates to a stator core, including a cylindrical core base and a set of posts extending radially inward from the stator core defining a set of slots between adjacent posts, wherein at least a subset of the posts define a first side facing a first slot, the first side having a polygonal form, and a second side facing a second slot, opposite the first slot, the second side having a parabolic form. The subset of posts are adapted to resist circumferential bending toward to the second slot.

DESCRIPTION OF EMBODIMENTS OF THE INVENTION

Figure 1:
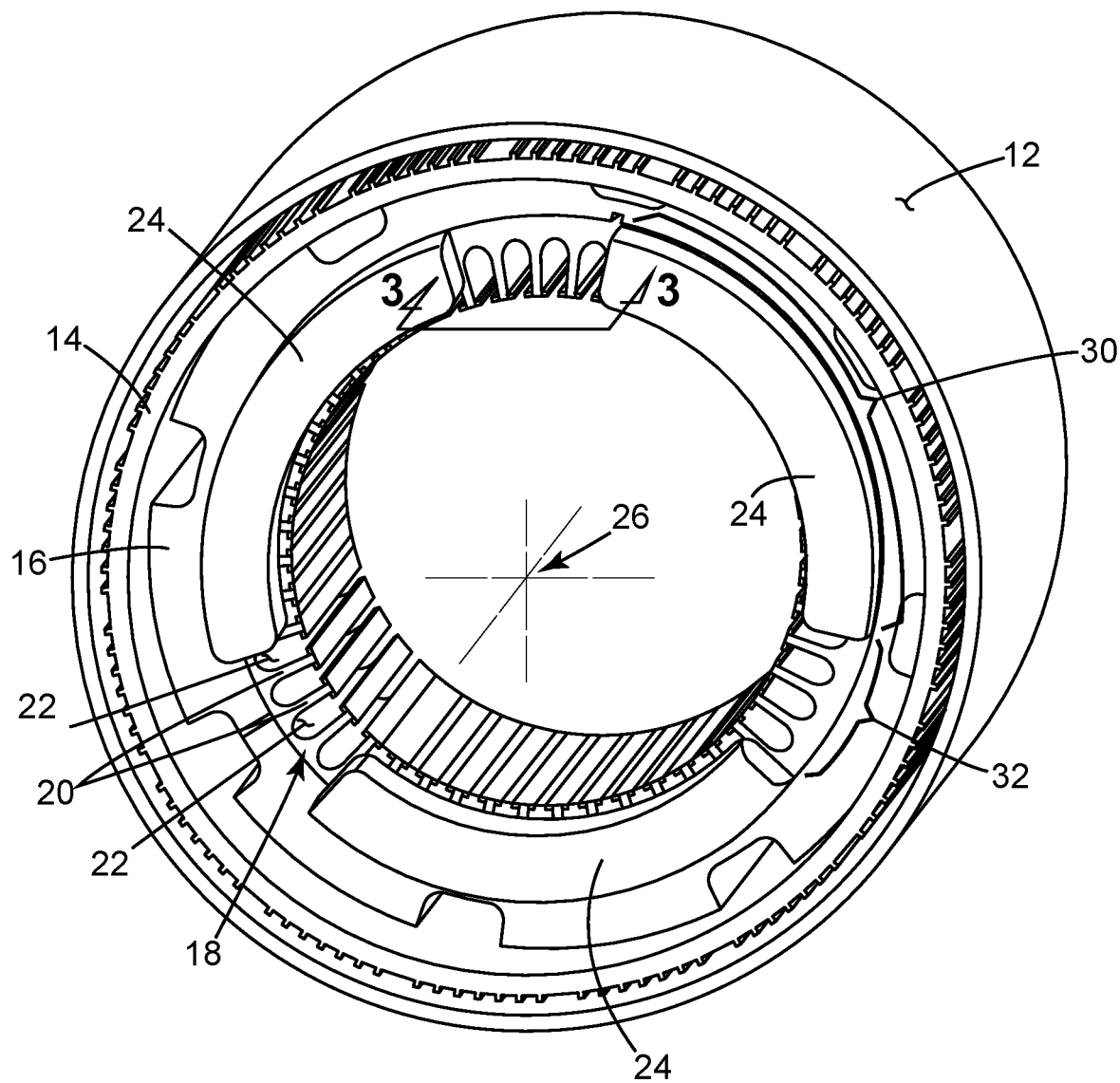
FIG. 1 is an isometric view of a stator assembly in accordance with various aspects described herein.

Aspects of the disclosure can be implemented in any stator assembly or electric machine assembly having a set of wound stator slots and another set of unwound or empty stator slots. For purposes of this description, the stator assembly is described with respect to an electric machine, electric machine assembly, generator, or similar language, which is meant to clarify that one or more stator/rotor combinations can be included in the machine. Non-limiting aspects of an electric machine can include an electric generator, an electric motor, a starter/generator, or the like.

While "a set of" various elements will be described, it will be understood that "a set" can include any number of the respective elements, including only one element. As used herein, the terms "axial" or "axially" refer to a dimension along a longitudinal axis of a referential component or along a longitudinal axis of a component disposed relative to the respective axis.

As used herein, the terms "radial" or "radially" refer to a dimension extending between a center longitudinal axis of a respective component, or a circular or annular component disposed relative to a respective component. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

The exemplary drawings are for purposes of illustration only and the dimensions, positions, order and relative sizes reflected in the drawings attached hereto can vary.

FIG. 1 illustrates a stator assembly 10 for an electric machine. As shown, in one non-limiting example configuration, the stator assembly 10 can include, in a radially arranged relationship, an outer stator case 12, a stator frame 14, a stator support 16, and a stator core 18. As shown, each of the aforementioned components can be radially arranged about a common longitudinal axis 26 extending in an axial direction of the stator assembly 10. As shown, the stator core 18 can include a generally cylindrical form received radially within the stator support 16, also having a generally cylindrical form. The stator support 16 can include a thermally conductive composition, including but not limited to, T6-6061 aluminum. In another non-limiting example, the stator core 18 is press fit into the stator support 16 with approximately a 2.5 millimeter clearance.

The stator support 16 is further radially received, such as via press-fitting, within the stator frame 14, also having a generally cylindrical form. The stator frame 14 can further be radially received, such as via press-fitting within the outer stator case 12, having a generally cylindrical form. In one non-limiting example, the stator frame 14 is press fit into the outer stator case 12 with approximately a 1 millimeter clearance.

The stator core 18 can further include a set of posts 20 or teeth extending from the core 18 radially inward toward the longitudinal axis 26. The set of posts 20 can further define a set of slots 22, such as openings, gaps, spaces, or the like, between adjacent posts 20. At least a subset of the slots 22 can be wound with a conductive wire or set of conductive wires to form a set of stator windings 24, schematically illustrated in FIG. 1. In one non-limiting example, fewer than all of the set of slots 22 can include the set of stator windings 24. Thus, aspects of the disclosure can be included wherein at least a subset of adjacent slots 22 including the set of stator windings 24 can define a first subset of "wound" slots 30 while a another subset of adjacent slots 22 not including the set of stator windings 24 can define a second subset of "unwound" or empty slots 32.

In the illustrated example of FIG. 1, the stator assembly 10 can include three distinct subsets of wound slots 30 circumferentially separated or spaced from one another by three distinct subsets of empty slots 32. In one non-limiting example, the stator assembly 10 can include a stator assembly 10 for a permanent magnet generator assembly.

Figure 2:
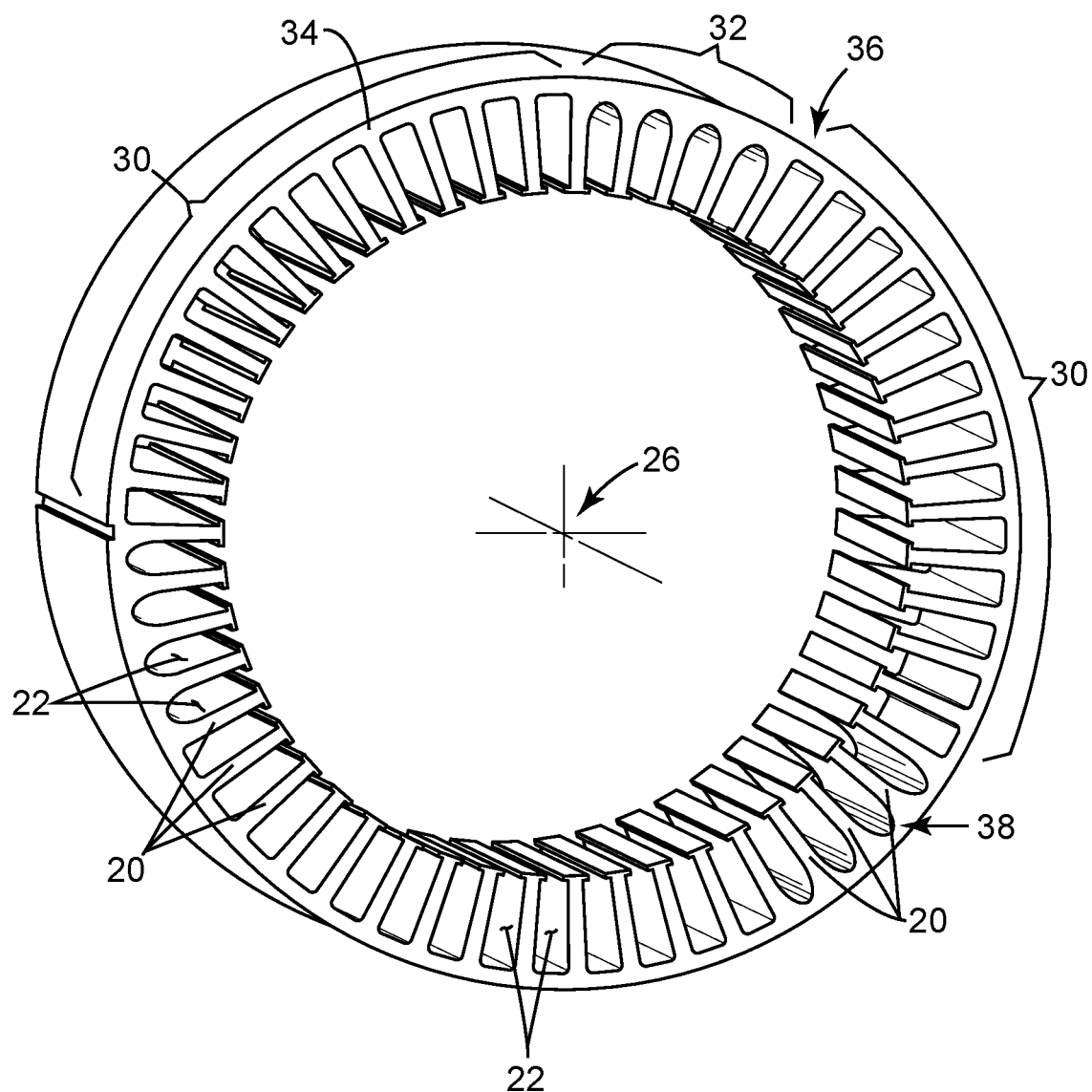
FIG. 2 is an isometric view of a stator core of the stator assembly of FIG. 1, in accordance with various aspects described herein.

FIG. 2 illustrates an example of the stator core 18 of FIG. 1. As shown, the stator core 18 can include a circumferentially continuous core base 34 or core ring, from which the set of posts 20 extend inwardly. The forming, coupling, shaping, contouring, or the like, of the core base 34 with the first subset of wound slots 30 can be different from or vary from the forming, coupling, shaping, contouring, or the like, of the core base 34 with the second subset of empty slots 32. For example, the first subset of wound slots 30, or the subset of posts 20 defining the subset of wound slots 30, can be connected with, attached to, or formed from the core base 34 in a generally polygonal form, defining a polygonal slot 36. As used herein, a "generally polygonal form" can include approximately or substantially right angles defining the respective post 20. For example, as shown, the subset of wound slots 30 generally define a squared-off slot or structure proximate to the core base 34.

In contrast, non-limiting examples of the second subset of empty slots 32, or the subset of posts 20 defining the subset of empty slots 32, can be connected with, attached to, or formed from the core base 34 in a generally parabolic form, defining a parabolic slot. As used herein, a "generally parabolic form" can include any non-right angling, curve, transition, smoothing, radial (relative to the slot 32), elliptical, circularly formed, or other contoured transition from the post 20 to the core base 34 defined at least in part by a radial curvature. For example, as shown, the subset of empty slots 32 generally define a set of slots 32 having a rounded base (that is, proximate to the core base 34), or a set of U-shaped slots 32, wherein the U-shaped legs extend toward the longitudinal axis 26.

As previously described, first subset of wound slots 30 include the polygonal slots 36 and receive the set of stator windings 24, while the second subset of empty slots 32 include the parabolic slots 38 which do not receive the set of stator windings 24. Aspects of the disclosure can be included wherein, for instance, a single post 20 can define a polygonal slot 36 on a first side and define a parabolic slot 38 on a second side, opposite of the first side.

Figure 3:
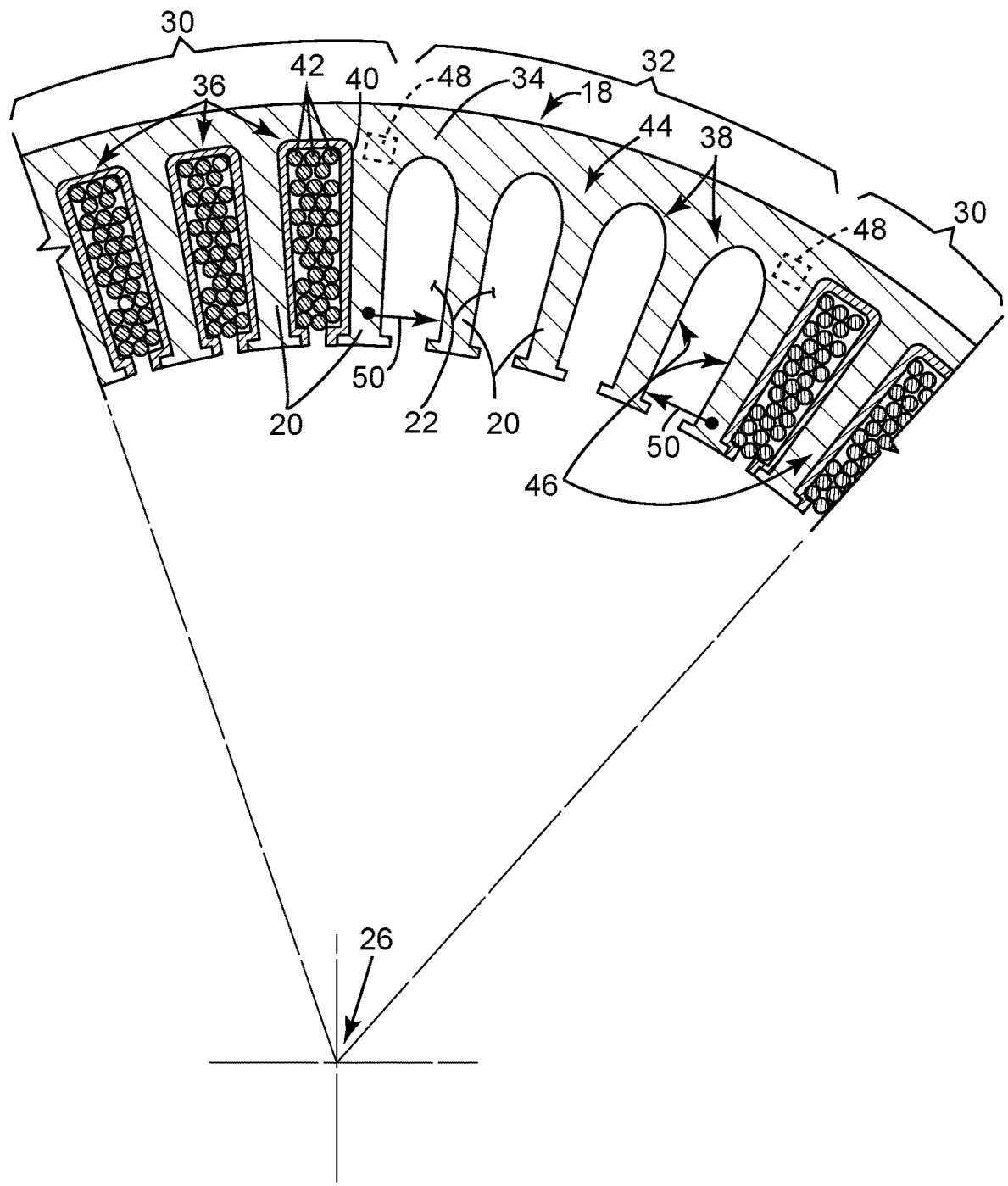
FIG. 3 is a schematic cross-sectional view of the stator assembly of FIG. 1, taken along line III-III of FIG. 1, in accordance with various aspects described herein.

FIG. 3 illustrates a schematic cross section view of the stator assembly 10 of FIG. 1, take along line III-III of FIG. 1. As shown, the first subset of wound slots 30 can include polygonal slots 36 holding, wound with, or otherwise containing conductive wires 42 defining the set of stator windings 24. The polygonal slots 36 can further be lined with an electrically non-conductive layer 40, such as Kapton, to prevent electrical contact between the conductive wires 42 and the stator core 18. Also as shown, the second subset of empty slots 32 can include the parabolic slots 36, unwound with wires 42, windings 24, or the like.

Non-limiting aspects of the subset of posts 20 defining the second subset of empty slots 32 can further include a post base 44 proximate or adjacent to the core base 34, and at least partially defining the generally parabolic form, and a post distal end 46, that is, an end of the post 20 extending radially inward toward the longitudinal axis 26 and spaced from the post base 44 of core base 34. At least a portion (illustrated schematically as box 48) of the post base 44 can be shaped, configured, arranged, contoured, or the like, to include the generally parabolic form. Generally, the post base 44 facing the empty slots 32 will have an increased amount of stator material proximate to the portion 48 shown, compared with the post base 44 facing the would slots 30.

The shaping, configuration, arrangement, contouring, or the like, of the post base 44, or portion 48 thereof can be structured, adapted, enabled, or the like to resist, prohibit, inhibit, prevent, reduce, or the like, a bending or physical stressing of the post distal end 46 tangentially or circumferentially away from an adjacent wound slot 30 toward the opposing empty slot 32. Additionally, the increased amount of stator material proximate to the portion 48 shown can be structured, adapted, enabled, or the like to resist, prohibit, inhibit, prevent, reduce, or the like, a bending or physical stressing of the post distal end 46 tangentially or circumferentially away from an adjacent wound slot 30 toward the opposing empty slot 32. Stated another way, the shaping, configuration, arrangement, contouring, or the like, of the post base 44, or portion 48 thereof is configured to prevent or reduce bending of the post bounded on one side with conductive wires 42 or a set of stator windings 24, from bending toward the opposing side that is empty. An example view of the bending direction is schematically represented by arrows 50.

In one non-limiting example, the bending or physical stressing of the post 20 can include cantilever stress on the post distal end 46, a tension due to the winding of the conductive wires 42, the expansion of the stator core 18 or conductive wires 42 upon the conduction of current through the set of windings 24 (e.g. thermal expansion of the respective components during current-carrying operations), or a combination thereof. Thus the shaping, configuration, arrangement, contouring, or the like, of the post base 44, or portion 48 can reinforce, support, stiffen, or otherwise counter the direction of bending 50 to counteract the bending or physical stressing of the post 20, as described.

In non-limiting examples, each respective post 20, post base 44, or the like, of the second subset of empty slots 32 can be configured as described herein to counteract the bending or physical stressing of the post 20. In another non-limiting example, only a subset of the posts 20 that define adjacent slots 22, wherein a first adjacent slot is a wound slot 30 and a second adjacent slot is an empty slot 32, can be configured as described herein to counteract the bending or physical stressing of the post 20.

Figure 4:
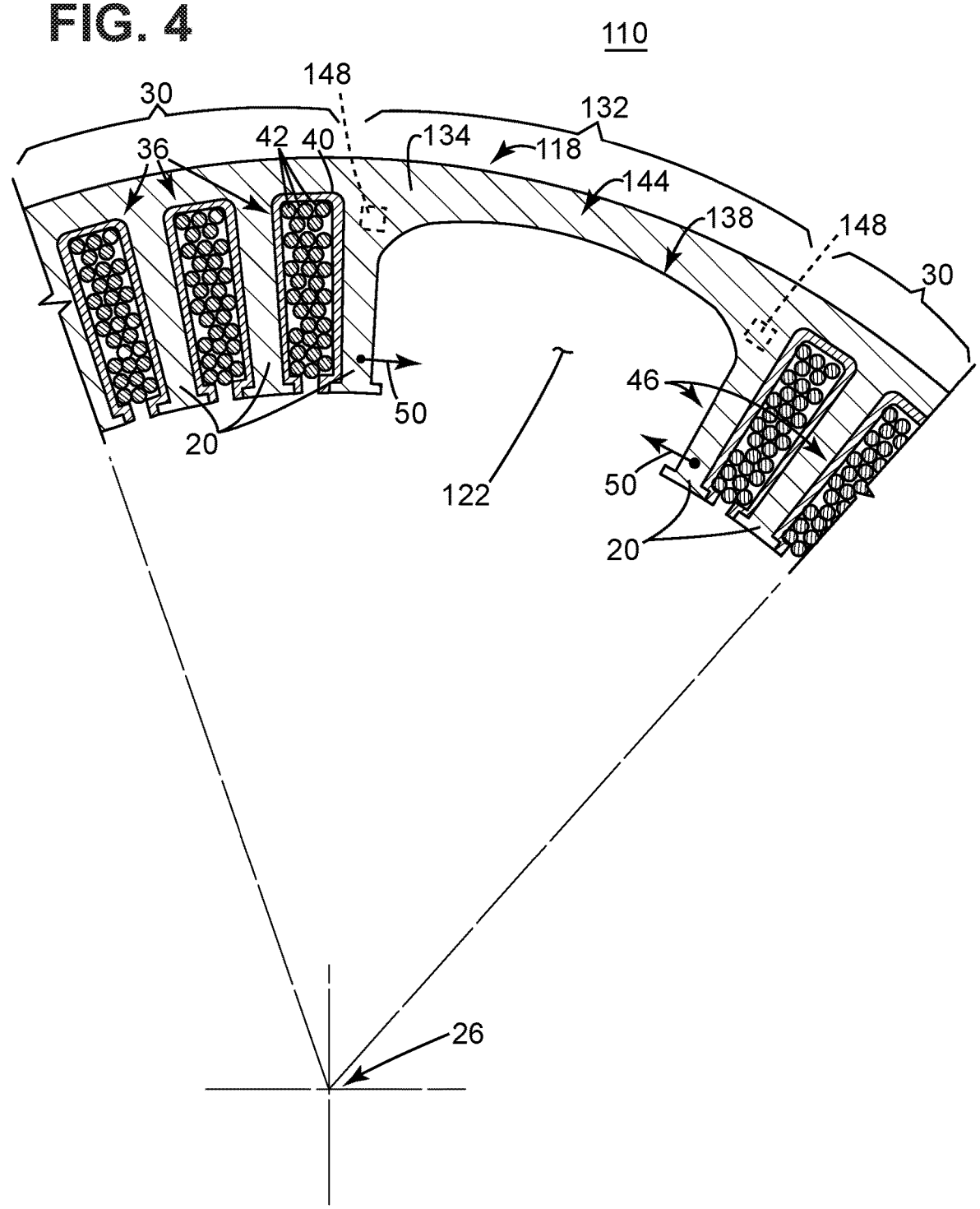
FIG. 4 is a schematic cross-sectional view of another stator assembly, in accordance with various aspects described herein.

FIG. 4 illustrates another stator assembly 110 in accordance with aspects of the disclosure. The stator assembly 110 is similar to the stator assembly 10; therefore, like parts will be identified with like numerals increased by 100, with it being understood that the description of the like parts of the stator assembly 10 applies to the stator assembly 110, unless otherwise noted. One difference is that the stator assembly 110 can include only a single empty slot 132 between the first subset of wound slots 30. In this case, the respective end posts 20 defining the slot 122, post base 144, post base portion 148, or a combination thereof can include or define the parabolic slot 138 to counteract the bending or physical stressing of the post 20.

Aspects of the disclosure can also include a method of forming a stator core 18, 118 or stator assembly 10, 110, as described herein. For example, a method of forming the stator core 18, 118 or stator assembly 10, 110 can include providing the cylindrical stator core 18, 118 having a set of posts 20 extending radially inward from the stator core 18, 118 defining a set of slots 22, 122 between adjacent posts 20, the set of slots 22, 122 comprising a first subset of winding slots 30 and a second subset of empty slots 32, 132, wherein a subset of posts 20 facing the a respective empty slot 32, 132 are adapted to resist circumferential bending toward to the respective empty slot 32, 132, as described herein. The method can further include winding conductive wiring 42 about a subset of the posts 20 to occupy the first subset of winding slots 30 with the conductive wiring 42.

The sequence described is for exemplary purposes only and is not meant to limit the method in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. Additionally, the design and placement of the various components such as valves, pumps, or conduits can be rearranged such that a number of different in-line configurations could be realized.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for an electric machine, comprising:
    a cylindrical stator core;
    a set of posts extending radially inward from the stator core defining a set of slots between adjacent posts; and
    a set of windings formed by conductive wire wound in a fewer than all of the set slots, defining a first subset of wound slots and a second subset of empty slots;
    wherein a subset of posts facing a respective empty slot are adapted to resist circumferential bending toward to the respective empty slot.

2. The stator assembly of claim 1 wherein a portion of the subset of posts facing the first subset of wound slots define a generally polygonal slot.

3. The stator assembly of claim 2 wherein the polygonal slot is in the form of a squared-off slot proximate to the stator core.

4. The stator assembly of claim 1 wherein a portion of the subset of posts facing the second subset of empty slots define a generally parabolic slot.

5. The stator assembly of claim 4 wherein the generally parabolic slot is in the form of a rounded slot base proximate to the stator core.

6. The stator assembly of claim 4 wherein the generally parabolic slot is in the form of a U-shape.

7. The stator assembly of claim 4 wherein the generally parabolic slot includes a curved transition portion connecting the respective post with the stator core.

8. The stator assembly of claim 7 wherein the curved transition portion inhibits cantilever stress on a distal end of the post, the cantilever stress in the direction of the empty slot.

9. The stator assembly of claim 4 wherein the generally parabolic slot includes an elliptical transition portion connecting the respective post with the stator core.

10. The stator assembly of claim 4 wherein the generally parabolic slot is configured to inhibit bending of the respective post toward the empty slot.

11. The stator assembly of claim 1 wherein the set of windings are wound for a permanent magnet generator stator assembly.

12. A method of forming a stator assembly for an electric machine, comprising:
    providing a cylindrical stator core having a set of posts extending radially inward from the stator core defining a set of slots between adjacent posts, the set of slots comprising a first subset of winding slots and a second subset of empty slots, wherein a subset of posts facing the a respective empty slot are adapted to resist circumferential bending toward to the respective empty slot; and
    winding conductive wiring about a subset of the posts to occupy the first subset of winding slots with the conductive wiring.

13. The method of claim 12, further comprising press-fitting the stator core within a stator frame.

14. The method of claim 12 further comprising rotating a permanent magnet generator rotor relative to the stator assembly to generate current in the conductive wiring.

15. A stator core, comprising:
    a cylindrical core base; and
    a set of posts extending radially inward from the stator core defining a set of slots between adjacent posts, wherein at least a subset of the posts define a first side facing a first slot, the first side having a polygonal form, and a second side facing a second slot, opposite the first slot, the second side having a parabolic form;
    wherein the subset of posts are adapted to resist circumferential bending toward to the second slot.

16. The stator core of claim 15 wherein the polygonal form includes a first side defining a portion of a squared-off slot proximate to the core base.

17. The stator core of claim 15 wherein the parabolic form includes a second side defining a portion of a rounded slot base proximate to the core base.

18. The stator core of claim 15 wherein the parabolic form includes a second side defining a portion of a curved transition portion connecting the respective post with the core base.

19. The stator core of claim 18 wherein the curved transition portion inhibits cantilever stress on a distal end of the post, the cantilever stress in the direction toward the second slot.

20. The stator core of claim 15 wherein the parabolic form includes a second side defining a portion of a U-shaped second slot.

\* \* \* \* \*